United States Patent
Miyamoto

(10) Patent No.: US 6,701,326 B2
(45) Date of Patent: Mar. 2, 2004

(54) DATABASE APPARATUS AND METHOD OF CONTROLLING OPERATION OF SAME

(75) Inventor: Takashi Miyamoto, Asaka (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 337 days.

(21) Appl. No.: 09/954,266

(22) Filed: Sep. 18, 2001

(65) Prior Publication Data
US 2002/0035558 A1 Mar. 21, 2002

(30) Foreign Application Priority Data
Sep. 19, 2000 (JP) ...................... 2000-282774

(51) Int. Cl.[7] .............................................. G06F 17/30
(52) U.S. Cl. .................................................. 707/104.1
(58) Field of Search ........................ 707/104.1, 3, 100, 707/1, 5; 345/419

(56) References Cited

U.S. PATENT DOCUMENTS

| | | | | |
|---|---|---|---|---|
| 5,751,829 A | * | 5/1998 | Ringland et al. | 382/100 |
| 6,025,846 A | * | 2/2000 | Chudley | 345/419 |
| 6,263,335 B1 | * | 7/2001 | Paik et al. | 707/5 |
| 6,476,903 B1 | * | 11/2002 | Slater et al. | 355/40 |
| 6,606,636 B1 | * | 8/2003 | Okazaki et al. | 707/104.1 |

* cited by examiner

Primary Examiner—Safet Metjahic
Assistant Examiner—Sana Al-Hashemi
(74) Attorney, Agent, or Firm—McGinn & Gibb, PLLC

(57) ABSTRACT

Even if element data that is necessary for storage in a database has not all been entered within a record, registration of data in the database is allowed. To accomplish this, requisite input items, quasi-requisite input items and optional input items are defined in a database table. If, in regard to a requisite input item, the corresponding element data has not been entered, storage in the database is not allowed. With regard to a quasi-requisite input item, storage in the database is allowed even if the corresponding element data has not been entered. If element data is not entered for a requisite input item even upon passage of a certain period of time, access to the database is inhibited.

2 Claims, 4 Drawing Sheets

DATABASE TABLE (BEFORE INPUT OF ELEMENT DATA TO QUASI-REQUISITE INPUT ITEM)

| IMAGE (REQUISITE INPUT ITEM) | DATE OF PHOTOGRAPHY (REQUISITE INPUT ITEM) | DATE OF PHOTOGRAPHER (QUASI-REQUISITE INPUT ITEM) | COMMENTS (OPTIONAL INPUT ITEM) |
|---|---|---|---|
|  | 20.08.2000 | (VACANT) | (VACANT) |
|  | 21.08.2000 | (VACANT) | (VACANT) |
| ... | ... | ... | ... |

DATABASE TABLE (AFTER INPUT OF ELEMENT DATA TO QUASI-REQUISITE INPUT ITEM)

| IMAGE (REQUISITE INPUT ITEM) | DATE OF PHOTOGRAPHY (REQUISITE INPUT ITEM) | DATE OF PHOTOGRAPHER (QUASI-REQUISITE INPUT ITEM) | COMMENTS (OPTIONAL INPUT ITEM) |
|---|---|---|---|
|  | 20.08.2000 | TARO TOKKYO | (VACANT) |
|  | 21.08.2000 | HANAKO JITSUYO | (VACANT) |
| ... | ... | ... | ... |

DATABASE APPARATUS AND METHOD OF CONTROLLING OPERATION OF SAME

BACKGROUND OF THE INVENTION

1. Field of the Invention

This invention relates to a database apparatus and to a method of controlling the operation of the database apparatus.

2. Description of the Related Art

A relational database has requisite input items and optional input items. A requisite input item is such that unless element data is entered for this item, element data of the record that contains the item cannot be stored in the database. An optional input item is such that even if element data is not entered for this item, element data of the record that contains the item can be stored in the database.

Because data in a record containing a requisite input item cannot be stored in a database unless element data is entered for this item, element data that a user attempts to input for the requisite input item cannot be entered later.

DISCLOSURE OF THE INVENTION

Accordingly, an object of the present invention is to allow the storage of element data, which is necessary to accomplish storage in a database, in the database even if not all of the element data has been entered in a record.

According to the present invention, the foregoing object is attained by providing a database apparatus comprising: a relational database in which requisite input items and quasi-requisite input items have been defined; a first determination unit (first determination means) for determining, in response to application of a store command, whether element data of a requisite input item has been entered; a storage unit (storage means) for storing, in the relational database, element data of a record containing a requisite input item for which the first determination unit has determined that element data has been entered; a second determination unit (second determination means) for determining whether element data has not been stored for a quasi-requisite input item of the relational database; an alerting unit which, in response to a determination by the second determination unit that element data has not been stored, is for giving notification to this effect; and a controller for limiting access to the relational database in dependence upon the fact that the quasi-requisite input item is vacant for a certain period of time following storage of element data in the relational database.

The present invention provides also a method suited to the above-described apparatus. Specifically, the method comprises the steps of: defining requisite input items and quasi-requisite input items in a relational database; determining, in response to application of a store command, whether element data of a requisite input item has been entered; storing, in the relational database, element data of a record containing a requisite input item for which it has been determined that element data has been entered; determining whether element data has not been stored for a quasi-requisite input item of the relational database; in response to a determination that element data has not been stored, giving notification to this effect; and limiting access to the relational database in dependence upon the fact that the quasi-requisite input item is vacant for a certain period of time following storage of element data in the relational database.

In accordance with the present invention, quasi-requisite input items are defined in addition to the above-mentioned optional input items. As described above, a requisite input item is such that unless element data is entered for this item, element data of the record that contains the item cannot be stored in a database. A quasi-requisite input item is such that even if element data is not entered for this item, the record containing the item can be stored in the database though utilization of the database is limited when this item is vacant for a certain period of time.

In accordance with the present invention, whether element data has been entered for a requisite input item is determined when a store command is applied. If element data has been entered for a requisite input item, element data in the record that contains this requisite input item is stored in the relational database.

Furthermore, whether element data has not been stored for a quasi-requisite input item of the relational database is determined. When element data has not been stored for a quasi-requisite input item, notification of this fact is given. If a quasi-requisite input item is vacant for a certain period of time, access to the relational database is inhibited.

In accordance with the present invention, quasi-requisite input items are defined and even if element data has not been entered for a quasi-requisite input item, element data of a record that contains this quasi-requisite input item can be stored in a relational database. If element data has not been entered for the quasi-requisite input item, notification to this effect is given to thereby alert the user. If the quasi-requisite input item is vacant for a fixed period of time, access to the relational database is limited.

Thus, in accordance with the present invention, even if an item (a quasi-requisite input item) requiring an input is vacant for the time being, element data can be stored as relational data. The necessary element data can be stored in the relational database later.

The alert can be realized as by transmitting e-mail, placing a call by a telephone, performing a facsimile transmission using a facsimile machine or producing an output by a printer.

Further, it may be so arranged that the alert is repeated at regular time intervals.

Furthermore, if image data has been stored in a database as element data, images (inclusive of thumbnail images) represented by this image data may be output or the image data may be transmitted to thereby give notification of the images. Since the images can be checked, the user can ascertain the element data that should be input for a quasi-requisite input item in regard to the particular content.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Figure 1:
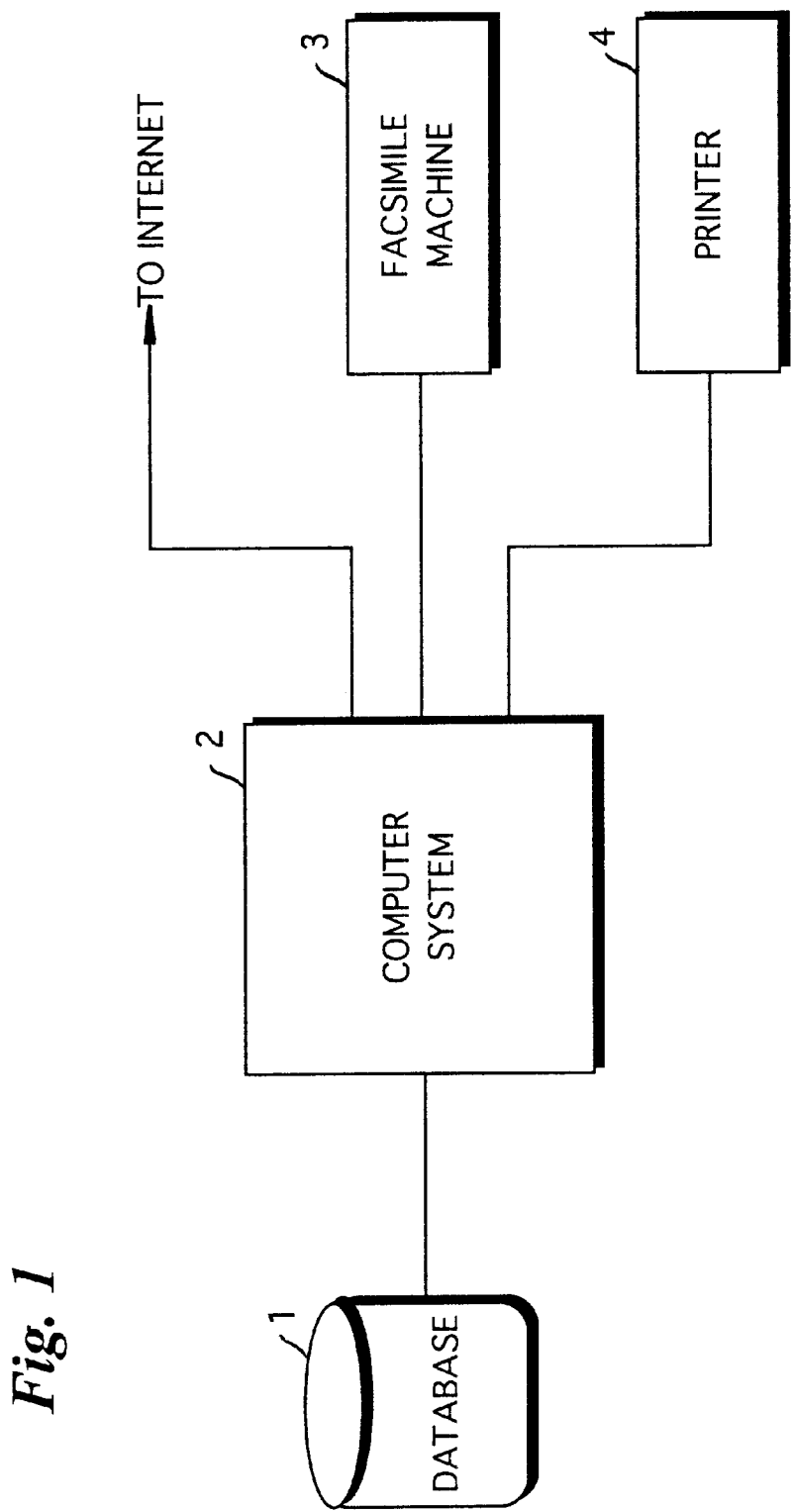
FIG. 1 is a block diagram illustrating the electrical construction of a database apparatus.

FIG. 1 is a block diagram illustrating the electrical construction of a database apparatus embodying the present invention.

The overall operation of the database apparatus is controlled by a computer system 2.

A database 1 for storing a database, a facsimile machine 3 for performing a facsimile transmission and a printer 4 for producing a printout are connected to the computer system 2. Further, the computer system 2 can be connected to a network such as the Internet. An arrangement may be adopted in which the computer system 2 is connected to a telephone.

By way of example, the computer system 2 is a personal computer and includes a CPU, a memory, a hard-disk drive, a floppy-disk drive, a keyboard and a mouse.

Figure 2:
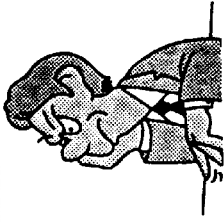
FIGS. 2 and 3 are examples of database tables.
Figure 2:
Figure 3:
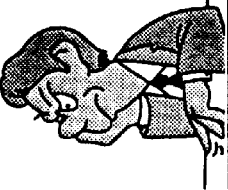
Figure 3:

FIGS. 2 and 3 illustrate database tables that have been stored in the database 1. It goes without saying that a database table need not physically have the form of a table; it will suffice if the database table has the form of a table logically.

As will be described later, FIG. 2 illustrates a database table before element data is input to quasi-requisite input items, and FIG. 3 illustrates the database table after element data is input to the quasi-requisite input items.

Each row of a database table is referred to as a record, and each column of the database table is referred to as a data item. Data items of the database table include a requisite input item, a quasi-requisite input item and an optional input item.

A requisite input item is such that if element data (data input to each item shall be referred to as element data) has not been input to the item, then none of the element data of the record that contains this requisite input item is stored in the database 1.

A quasi-requisite input item is such that even if element data has not been input to the item, all of the element data of the record that contains this quasi-requisite input item is stored in the database 1. If the quasi-requisite input item is vacant for a certain period of time, however, access to the database 1 is limited.

An optional input item is such that even if element data has not been input to the item, all of the element data of the record that contains this optional input item can be stored in the database 1 and access to the database is possible even if a vacant state prevails.

The database table has image, date-of-photography, photographer and comment data items. Image and date of photography are requisite input items. If element data has not been input to these items, then element data will not be stored in the database 1, as mentioned above. A photographer is a quasi-requisite input item. Even if element data has not been input to this item, element data will be stored in the database 1, as set forth above. However, if element data is not stored in a quasi-requisite input item for a certain period time following storage of element data in the database 1, then access to the database 1 is limited. A comment is an optional input item. Even if element data has not been input to this item, element data will be stored in the database 1, and even if all element data is not input subsequently, access to the database 1 is not limited.

Figure 4:
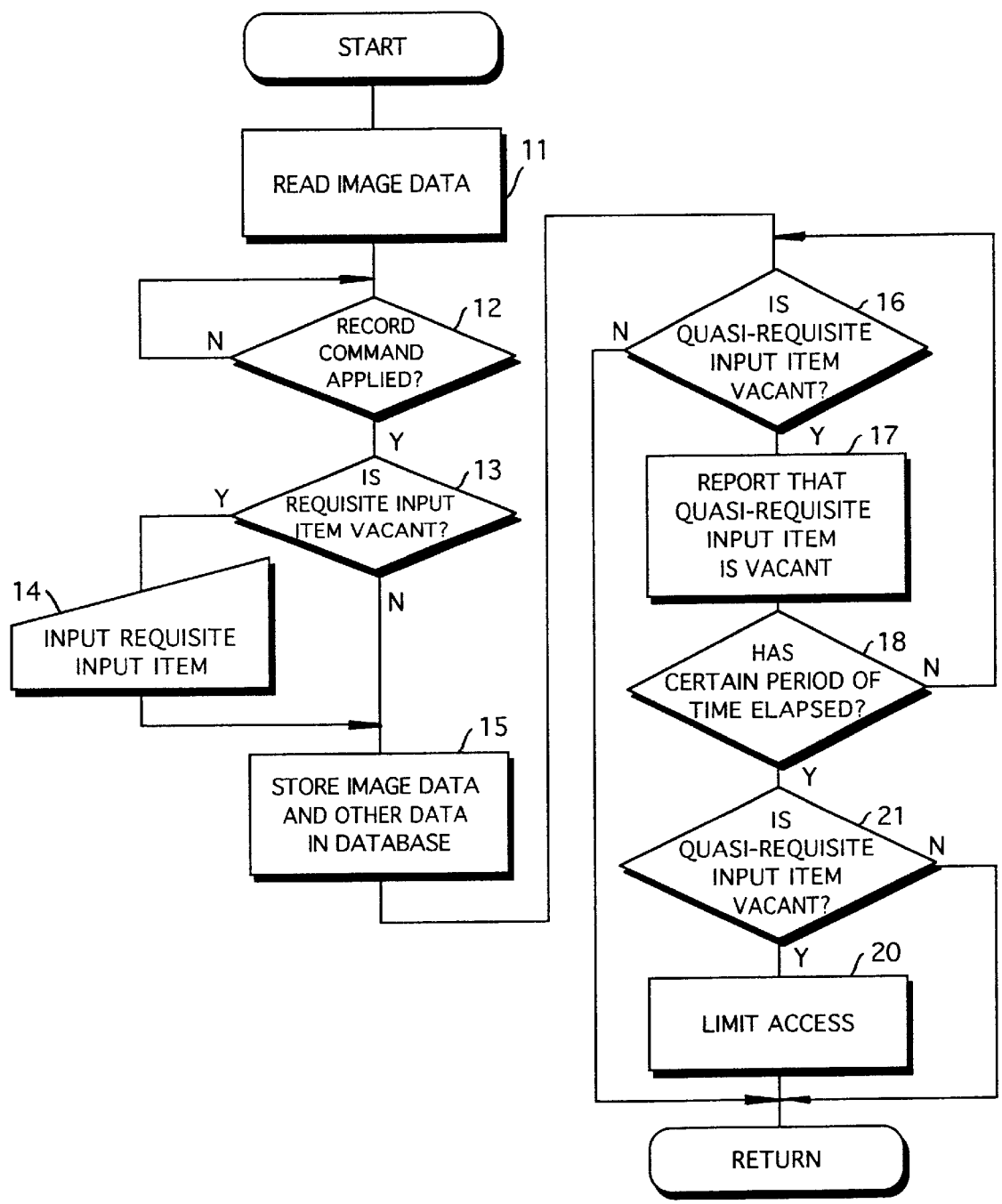
FIG. 4 is a flowchart illustrating processing executed by the database apparatus.

FIG. 4 is a flowchart illustrating processing executed by the database apparatus.

First, a floppy disk or the like on which image data has been stored is inserted into the computer system 2 and image data to be stored in the database 1 is read from the floppy disk (step 11). The image data that has been read is stored temporarily in the computer system 2.

Whether a command for registering image data in the database 1 has been issued by the user is checked (step 12).

It is then determined whether a requisite input item of a record containing an item for which this image data is to be registered as element data is vacant or not (step 13). If the record is vacant ("YES" at step 13), then element data is input to the requisite input item by the user using the computer system 2 (step 14). In the example of FIGS. 2 and 3, requisite input items are an image and date of photography. If image data has been input, therefore, a check is made to see whether date of photography has been input as element data to the date-of-photography data item. If element data has been input to all of the requisite input items and no requisite input item is vacant ("NO" at step 13), then the processing of step 14 is skipped.

If element data is input to all of the requisite input items included in a record to be registered in the database 1, then the image data and other data (element data) that has been input to each item of the record will be stored in the database 1 (step 15).

If element data is stored in the database 1, then a check is made to determine whether a quasi-requisite input item of the database table that has been stored in the database 1 is vacant (step 16). If the quasi-requisite input item is vacant ("YES" at step 16), then the fact that the quasi-requisite input item is vacant is reported to the user as by outputting this fact by the printer 4 (step 17). By observing the printout produced by the printer 4, the user ascertains that element data has not been input to the quasi-requisite input item. The element data would then be input from the computer system 2 and stored in the quasi-requisite input item.

The user may be notified via the Internet. Furthermore, it may be so arranged that when a user other than the user operating the database apparatus is notified, the facsimile machine 3 is used to transmit notification automatically to the facsimile machine possessed by the other user. An arrangement may be adopted in which a telephone is provided instead of the facsimile machine 3 and the telephone is used to call the other user.

It is determined whether a quasi-requisite input item is in the vacant state for a certain period of time (which would be measured by a timer) (step 18). If this certain period of time has elapsed ("YES" at step 18), then whether the quasi-requisite input item is vacant is checked again (step 21). If the quasi-requisite input item is vacant ("YES" at step 21), then access to the database 1 is inhibited (step 20). More specifically, a password for accessing the database 1 is imposed as a restriction.

It goes without saying that if a quasi-requisite input item is not vacant ("NO" at step 16 or 21), then access to the database 1 will not be inhibited.

This embodiment is such that even if there is not an input of data regarding element data desired for a requisite input item, other element data can be stored in the database 1 for the time being and then the first-mentioned element data can be stored later. Image data can be stored in the database 1 as element data and the photographer of the image represented by the image data can be stored in the database 1 later. This concept can be developed in various ways. For example, image data can be transmitted to and stored in a database of a newspaper publishing company at once and the description of the image can be stored in the database 1 later. When a product catalog is created, a cameraman can photograph the product and store the image of the product in a database and later a product specialist different from the cameraman can store the product description in the database.

Furthermore, in the above-described embodiment, access to the database 1 is enabled initially and then access is subsequently limited. Conversely, however, an arrangement may be adopted in which access to the database 1 is limited initially and the limitation upon access to the database is subsequently removed.

Further, items which have not yet been input for quasi-requisite input items may be listed up and then entered at one time.

As many apparently widely different embodiments of the present invention can be made without departing from the spirit and scope thereof, it is to be understood that the invention is not limited to the specific embodiments thereof except as defined in the appended claims.

What is claimed is:

1. A relational database in which requisite input items and quasi-requisite input items have been defined;
    a first determination unit for determining, in response to application of a store command, whether element data of a requisite input item has been entered;
    a storage unit for storing, in the relational database, element data of a record containing a requisite input item for which said first determination unit has determined that element data has been entered;
    a second determination unit for determining whether element data has not been stored for a quasi-requisite input item of the relational database;
    an alerting unit which, in response to a determination by said second determination unit that element data has not been stored, is for giving notification to this effect; and
    a controller for limiting access to the relational database in dependence upon the fact that the quasi-requisite input item is vacant for a certain period of time following storage of element data in the relational database.

2. A method of controlling operation of a database apparatus, comprising the steps of:
    defining requisite input items and quasi-requisite input items in a relational database;
    determining, in response to application of a store command, whether element data of a requisite input item has been entered;
    storing, in the relational database, element data of a record containing a requisite input item for which it has been determined that element data has been entered;
    determining whether element data has not been stored for a quasi-requisite input item of the relational database;
    in response to a determination that element data has not been stored, giving notification to this effect; and
    limiting access to the relational database in dependence upon the fact that the quasi-requisite input item is vacant for a certain period of time following storage of element data in the relational database.

* * * * *